United States Patent

Lentz

[15] 3,699,386

[45] Oct. 17, 1972

[54] FIRING CIRCUIT FOR GAS DISCHARGE TUBES

[72] Inventor: John J. Lentz, 27 Hywood Place, Chappaqua, N.Y. 10514

[22] Filed: Feb. 11, 1970

[21] Appl. No.: 14,891

Related U.S. Application Data

[62] Division of Ser. No. 388,160, Oct. 26, 1953, Pat. No. 3,517,391.

[52] U.S. Cl. ................315/356, 317/149, 328/210, 328/223, 331/166
[51] Int. Cl. ....H01h 47/30, H01j 17/36, H03b 11/08
[58] Field of Search......315/252, 258, 289, 352, 353, 315/356, 349; 328/210, 223; 331/165, 166; 317/140, 141 R, 142 R, 149; 307/246, 252 R, 264, 267

[56] References Cited

UNITED STATES PATENTS 2,629,823 2/1953 Grandmont............331/166 X

Primary Examiner—Roy Lake
Assistant Examiner—Siegfried H. Grimm
Attorney—Hanifin and Jancin

[57] ABSTRACT

This specification describes a circuit for triggering a gas tube in response to a pulse whose magnitude may be small and whose length is indeterminate and may be short with respect to the time necessary to cause the conduction of the gas tube. The pulse is applied to the grid of a triode to cause it to conduct. The plate circuit of the triode contains an inductor which stores energy upon the application of the pulse. When the pulse ends and the triode turns off oscillations begin in a ringing circuit comprising the inductor and stray plate to ground capacitance. The energy then oscillating between the inductor and the capacitance produces a high energy pulse that triggers the gas tube.

5 Claims, 1 Drawing Figure

PATENTED OCT 17 1972  3,699,386
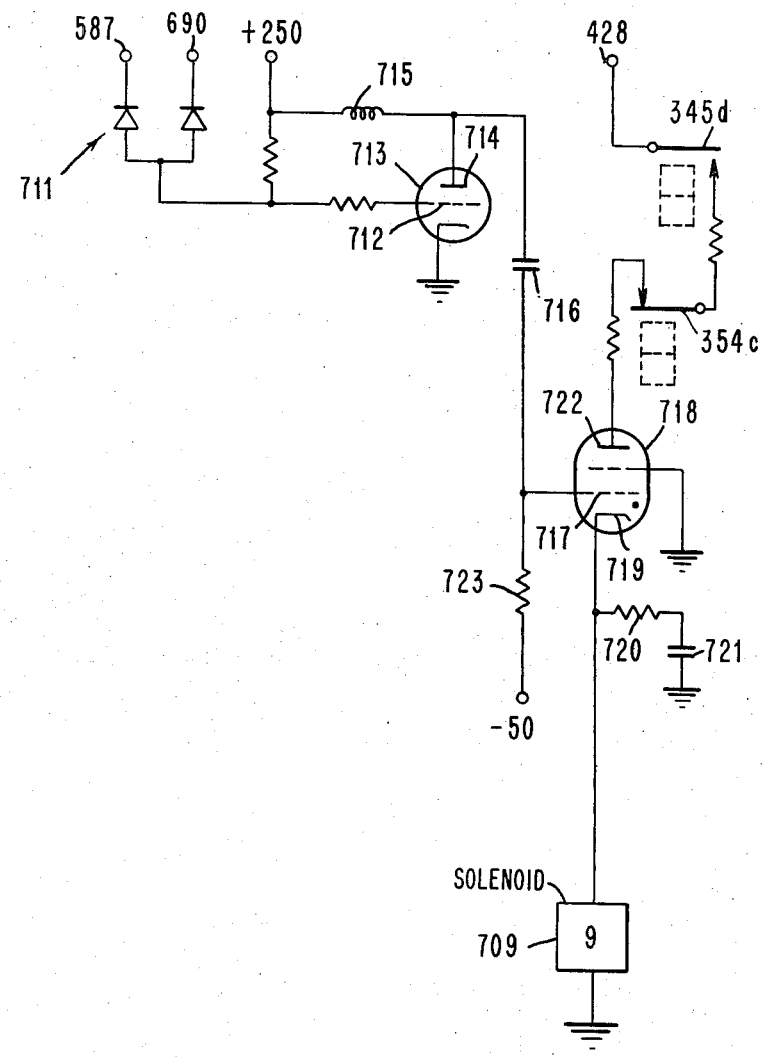

FIRING CIRCUIT FOR GAS DISCHARGE TUBES

BACKGROUND OF THE INVENTION

This is a division of application Ser. No. 388,160, filed Oct. 26, 1953 which has since issued as U.S. Pat. No. 3,517,391 on June 23, 1970.

This invention relates to a digital computer and more particularly to a circuit for controlling a switching device with a pulse whose magnitude and/or length may be short with respect to the time needed to activate the trigger circuit.

In digital computers it is sometimes necessary to trigger a switching circuit into operation with the output of a logic circuit, such as an AND circuit. Because the AND circuit requires the coincidence of two pulses that may overlap for only a short length of time, the output of the AND circuit may be of very short duration. This results in difficulty in triggering the switching device since the time needed to activate the device may be longer than the pulse provided by the output of the AND gate.

BRIEF DESCRIPTION OF THE INVENTION

In accordance with the present invention a circuit is described for starting a trigger device in response to a pulse whose magnitude may be small and whose length is indeterminate and may be short with respect to the time necessary to cause operation of the trigger device. The pulse is applied to the control terminal of the switching device to cause the switching device to conduct. The controlled path of the switching device contains an inductor which stores energy upon the application of the pulse. When the pulse ends and the switching device turns off oscillations begin in a ringing circuit comprising the inductor and stray circuit capacitance. These oscillations result in a high energy pulse that starts the trigger device.

Therefore, it is an object of the present invention to provide a circuit for activating trigger devices with a pulse of short duration.

It is another object of the invention to provide an arrangement for insuring firing of a gaseous discharge device by a pulse of short duration and small amplitude.

DESCRIPTION OF THE DRAWING

These and other objects, features and advantages of the invention will be apparent from the preferred embodiment of the invention as illustrated in the accompanying drawing, of which the sole FIGURE is an electrical schematic of one embodiment of the present invention.

Referring now to the drawing, the pulses at terminal 690 and at terminal 587 serve as the two inputs of an "AND" circuit 711, the output of which is connected to the grid 712 of a triode 713 operating as an amplifier. Anode 714 of triode 713 has associated with it an inductive element 715 serving as a load impedance, and anode 714 is coupled through a capacitor 716 to the control grid 717 of a gaseous discharge tube 718, preferably of the thyratron type. Solenoid 709 is connected between ground and the cathode 719 of tube 718. A series network comprising a resistor 720 and a capacitor 721 is connected between cathode 719 and ground. Anode 722 of tube 718 is connected, by means of normally closed relay contacts 354–c, normally open relay contacts 345–d and the illustrated resistance elements, to terminal 428. Anode 722 is initially energized by the pickup of sequencing relay 345, thus closing its contacts 345–d.

The structure just described comprises an important feature of the present invention, in that it insures the firing of discharge tube 718 when a coincidence occurs between a gate signal at terminal 587 and a similarly timed pulse appearing at terminal 690, even though the latter is of relatively short duration and small amplitude. This highly desirable result is achieved in the following manner. The output of "AND" circuit 711 when enabled raises the potential of grid 712, causing triode 713 to become highly conductive. This results in the storage of energy in inductive load device 715. When the signal pulse on line 690 ends, disabling "AND" circuit 711 and causing the potential of grid 712 to drop, tube 713 becomes nonconductive, and oscillations begin in the ringing circuit comprising inductive load device 715 and stray plate-to-ground capacitance, resulting in the production of a damped oscillatory wave having an initial amplitude of approximately 100 volts. The applications of this wave to control grid 717 via coupling capacitor 716 and a resistor 723 insures the immediate firing of discharge tube 718.

Upon ionization of tube 718, the oscillations are damped quickly by the flow of current through control grid 717. The network comprising resistor 720 and capacitor 721 is provided to supply an initial current path for the discharge of tube 718, in view of the fact that solenoid 709 is relatively a highly inductive load. The firing of tube 718 causes the actuation of solenoid 709. Deionization of tube 718 is accomplished by the opening of oscillator relay contacts 354–c after an ionization period of approximately 50 milliseconds.

Wherever in the above description particular tube types have been mentioned, it will be understood that this is by way of example only. Other types of tubes, and even other devices, such for example as crystal rectifiers or transistors, may be substituted without departing from the scope of the present invention.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A circuit for generating a high voltage firing pulse at the gate of a trigger device in response to an input signal pulse of indefinite and short duration, comprising:

an electronic switching device having a control terminal for the receipt of the signals of short duration to cause a controlled path of the electronic switching device to conduct when the signals are present or not conduct when signals are absent;

an inductive means and a source of energy connected in series with the controlled path of the electronic switching device so that as the electronic switching device conducts energy is stored from the source in the inductive means and when the electronic switching device stops conducting said inductive means forms a ringing circuit with the stray capacitance of the controlled path of the electronic switching device to generate oscillations; and capacitive means coupling the gate of the trigger device in shunt with the controlled path of the switching device whereby the trigger device is turned on by said oscillations.

2. The circuit of claim 1 including an AND circuit coupled to the control terminal of the switching device to generate the input signal pulse.

3. The circuit of claim 2 wherein said trigger device is a thyratron.

4. The circuit of claim 3 wherein said switching device is a triode.

5. The circuit of claim 4 including a normally closed switch coupled in the plate-cathode path of the thyratron which is opened to end conduction of the thyratron.

* * * * *